United States Patent [19]
Nishida et al.

[11] Patent Number: 5,192,962
[45] Date of Patent: Mar. 9, 1993

[54] CONVERGING REFLECTOR AND LIQUID CRYSTAL DISPLAY DEVICE

[75] Inventors: Masami Nishida; Masataka Izawa; Kunimoto Tsuchiya, all of Tokyo, Japan

[73] Assignee: Pioneer Electronic Corporation, Tokyo, Japan

[21] Appl. No.: 706,538

[22] Filed: May 29, 1992

[30] Foreign Application Priority Data

May 29, 1990 [JP] Japan .................................. 2-139396
Oct. 25, 1990 [JP] Japan .................................. 2-288211

[51] Int. Cl.$^5$ .......................... G03B 21/14; F21V 7/12
[52] U.S. Cl. ...................................... 353/98; 353/102; 359/49; 362/347
[58] Field of Search ........................ 353/31, 33, 34, 37, 353/98, 99, 102, 122; 359/49, 48; 362/296, 310, 347, 346, 341, 297, 302

[56] References Cited

U.S. PATENT DOCUMENTS

| | | | |
|---|---|---|---|
| 4,566,056 | 1/1986 | Kouchi | 362/297 |
| 4,612,608 | 9/1986 | Peitz | 362/297 |
| 4,735,495 | 4/1988 | Henks | 359/49 |
| 4,765,718 | 8/1988 | Henkes | 359/49 |
| 4,882,617 | 11/1989 | Vriens | 359/49 |
| 4,912,614 | 3/1990 | Goldenberg | 353/31 |
| 4,915,479 | 4/1990 | Clarke | 359/49 |

Primary Examiner—William A. Cuchlinski, Jr.
Assistant Examiner—William C. Dowling
Attorney, Agent, or Firm—Sughrue, Mion, Zinn, Macpeak & Seas

[57] ABSTRACT

A converging reflector comprises a linear light source having two end points located with a predetermined spacing therebetween, a first reflection surface having a curvature so as to have a focal point at one of the two end points, and a second reflection surface having another curvature so as to have a focal point at the other of the two end points. Accordingly, a light from the linear light source is incident onto the first and second reflection surfaces. Thus, this reflector can project a light as an ideal plane of projection, resulting in improved projection efficiency.

15 Claims, 11 Drawing Sheets

CONVERGING REFLECTOR AND LIQUID CRYSTAL DISPLAY DEVICE

BACKGROUND OF THE INVENTION

The present invention relates to a converging reflector to reflect a light from a light source to converge or condense and project the reflected light onto a predetermined plane of irradiation, and more particularly to a converging reflector capable of improving convergence efficiency and a liquid crystal display device including such a converging reflector.

Conventional converging reflectors of one type are formed by a reflection mirror of paraboloid of revolution (which will be simply referred to as a parabolic reflector hereinafter) wherein a light source is arranged at the focal point of the paraboloid of revolution to reflect a light from the light source to form a parallel light by means of the parabolic reflector.

Further, conventional converging reflectors of another type are formed by a reflecting mirror of ellipsoid of revolution (which will be simply referred to as an elliptic reflector hereinafter), wherein a light source is arranged at a first focal point of the ellipsoid of revolution to allow a light from the light source to converge into a second focal point by means of an elliptic reflector and the reflected light by the reflecting mirror is changed into a parallel light by means of a condenser lens whose focal point is coincident with the second focal point.

In the respective conventional converging reflectors, a point light source is arranged at the focal point of each reflecting mirror to thereby emit rays of parallel light or rays of convergent light, thus permitting those rays of light to be reflected on an ideal circular plane of projection or an ideal point.

Further, conventional liquid crystal display devices are of a structure to separate a white light from the converging reflector into rays of light of three colors of R, G and B by using three dichroic mirrors. Respective rays of color lights of R, G and B are incident on each of liquid crystal cells through a condenser lens to vary transmittance of the liquid crystal cell in dependency upon respective image signals to thereby allow respective rays of incident color lights of R, G and B to be transmitted therethrough or intercepted thereby, thus to project images corresponding thereto onto a screen through a projection lens.

However, since conventional converging reflectors are constructed as described above, a light source which can be considered as a point light source must be arranged at the focal point of the reflecting mirror in order to permit a light to be reflected on an ideal circular plane of projection or an ideal point. When an attempt is made to realize a light source of high luminance or brightness, the light source itself would be large. For example, a metal halide lamp is used as a high luminance one. However, a light is emitted between two electrodes in the metal halide lamp. For this reason, such a light source cannot be considered as a point light source and the size of that light source would not be negligible, thus disadvantageously failing to allow a light to be reflected on a circular plane of projection or a point.

Further, since a metal halide lamp of the double tube type employed as the light source mentioned above is of a structure using a large valve as its outer tube, a light reflected by the reflecting mirror impinges on the valve itself, and is scattered and absorbed, disadvantageously resulting in a lowered convergence efficiency.

In addition, in the case of conventional liquid crystal display devices, although a light from the converging reflector is projected through the dichroic mirrors, the condenser lenses, the liquid crystal cells, and the projection lens, only the convergence efficiency of the converging reflector is taken into consideration, but the correlation of the entirety of the device is not taken into consideration by any means. Thus, the convergence efficiency of the entirety of the device is unable to be improved.

SUMMARY OF THE INVENTION

The present invention has been made in order to solve the above-mentioned problems, and its object is to provide a converging reflector in which a plurality of curved reflection surfaces each having a curvature corresponding to each of a plurality of light sources are combined to form a reflecting mirror to thereby permit a light to be reflected on an ideal circular plane of projection or an ideal point thus to improve convergence efficiency, and a liquid crystal display device capable of improving convergence efficiency of the entirety of the device by using the above-mentioned converging reflector.

A converging reflector according to this invention comprises: a linear light source having two end points located with a predetermined space therebetween; a first reflection surface having a curvature so that one of the two end points forms a focal point thereof; and a second reflection surface arranged adjacently to said first reflection surface, and having the other curvature so that the other of the two end points forms a focal point thereof.

Further, a converging reflector according to this invention comprises: a linear light source having two end points located with a predetermined space therebetween; a first elliptic reflection surface having one focal point at one of the two end points of the linear light source and the other focal point at one end portion of a plane of irradiation for projecting a light from said linear light source; and a second elliptic reflection surface arranged adjacently to said first elliptic reflection surface, and having one focal point at one of the two end points and the other focal point at the other end portion of said plane of irradiation.

Further, a liquid crystal display device comprises: a converging reflector provided with a linear light source having two end points located with a predetermined space therebetween; a first reflection surface having a curvature so that one of the two end points forms one focal point; and a second reflection surface arranged adjacently to said first reflection surface and having the other curvature so that the other of the two end points forms one focal point; and a liquid crystal panel for selectively passing a light reflected from said converging reflector, wherein a contact point of said first and second reflection surfaces is positioned in the vicinity of a plane which is perpendicular to an optical axis of a light reflected from said converging reflector onto said liquid crystal panel, and which passes through said one end point of the linear light source, and wherein the other focal points of said first and second reflection surfaces are positioned, on a side of the light source, close to a plane of convergent projection of said liquid crystal panel and slightly inside of ends of a plane of convergent projection, respectively.

In addition, a liquid crystal display device comprises: a converging reflector provided with a linear light source having two end points located with a predetermined space therebetween, a first reflection surface having a curvature so as to have a focal point at one of the two end points and a second reflection surface arranged adjacently to the first reflection surface and having another curvature so as to have a focal point at the other of the end points; a liquid crystal panel for passing selectively a light reflected from said converging reflector; a condenser lens provided in front of said liquid crystal panel; and a projection lens for projecting, onto a plane of projection, a light emitted from said liquid crystal panel, wherein said device is formed so that a space between said end points of said linear light source in said converging reflector is about 6 mm, an aperture of the converging reflector is about 100 mm, and an effective display size of said liquid crystal panel is about 3 inches, wherein in a region where an F-number—in an F-number—length coordinate plane indicated by F-number of said projection lens and a length from an end of said aperture of the converging reflector to said liquid crystal panel is 3.0 to 4.5 and the length in said F-number—length coordinate is 200 to 300 mm, a coordinate axis perpendicular to said F-number—length coordinate plane is set as a focal length of said condenser lens, wherein, in said region, when the F-number is 3.0 and the length is 200 mm, the focal length is set in a range of 100 to 230 mm, when the F-number is 3.0 and the length is 300 mm, the focal length is set in a range of 70 to 120 mm, and when the F-number is 4.5 and the length is 300 mm, the focal length is set in a range of 150 to 450 mm.

Further, a liquid crystal display device comprising: a converging reflector provided with a linear light source formed of electrodes provided at two end points located with a predetermined space therebetween, a semitransparent light emitting tube arranged so as to surround an outer circumference of said electrodes, a first reflection surface having a curvature whose first back side focal point exists within said light emitting tube and whose first front side focal point exists on a side of a irradiation plate and a second reflection surface arranged adjacently to said first reflection surface and having another curvature whose second back side focal point exists within said light emitting tube at a point different from said first back side focal point and whose second front side focal point exists on a side of the irradiation plate; a liquid crystal panel for passing selectively a light reflected from said converging reflector; a condenser lens arranged between said converging reflector and said liquid crystal panel to condense a light reflected from said converging reflector toward said liquid crystal panel side; and a projection lens for projecting, onto a plane of projection, a light emitted from said liquid crystal panel, wherein said device is formed so that a space between said two end points of said linear light source is 5.0 to 7.0 mm, that an aperture of said converging reflector is 100±20 mm, that said liquid crystal panel has a dimension of 43 mm×58 mm, that a length between said converging reflector and said liquid crystal panel is 200 to 300 mm, that a focal length of said condenser lens is 250 to 500 mm, that an F-number of said projection lens is 3.0 to 3.5 mm, and that said projection lens is formed as a telecentric system, wherein said first back side focal point of said first reflection surface has coordinates of 1.5±1.0 mm, 0±0.5 mm in a coordinate system comprising a first axis coincident with an optical axis and a second axis perpendicular to the optical axis in which said one of the two end points of the linear light forms an origin, and wherein said second back side focal point of said second reflection surface has coordinates of 1.5±1.0 mm, 1.0±0.5 mm in said coordinate system.

There is employed an arrangement to reflect rays of light from the linear light source on the first and second reflection surfaces having different curvatures, whose focal points are positioned at two opposite end points of the linear light source, respectively, and rays of light from the linear light source provided at a position including focal points of the both reflection surfaces are reflected on the first and second reflection surfaces, respectively. Accordingly, a light from the linear light source is incident onto both of the first and second reflection surfaces. Thus, a light is reflected on an ideal circular plane of projection or an ideal point, thus making it possible to improve the convergence efficiency.

Further, this invention employs combination of a liquid crystal panel in a specific form and a converging reflector in a specific form, and has an aperture of a specific value, two light sources located with a specific spacing therebetween, connection points of the first and second reflection surfaces at respective specific positions, and other focal lengths at specific positions, thereby to satisfy the correlation between respective components. Thus, the convergence efficiency of the entirety of the device can be improved.

In addition, this invention employs a scheme to take a convergence efficiency into consideration over the entirety of the optical path, thereby to improve the convergence efficiency of the entirety of the device.

Furthermore, this invention employs an arrangement such that the light emitting tube of the linear light source is formed by a thin semitransparent body, and that a portion of the light emitting tube is screened. Thus, even in the case where the luminous intensity distribution on the liquid crystal panel varies, lowering of the convergence efficiency due to changes in the luminous intensity distribution is improved.

Further objects, features and other aspects of this invention will be understood from the following detailed description of the preferred embodiments of this invention with reference to the drawings.

BRIEF DESCRIPTION OF THE DRAWINGS

In the accompanying drawings:

FIG. 7 shows a partial profile (cross section) of a reflector in the case where the reflector is elliptic in cross section wherein

FIG. 13 shows an explanatory view of a light utilization efficiency of an eighth embodiment of this invention wherein

DESCRIPTION OF THE PREFERRED EMBODIMENTS

As conductive to a full understanding of the nature and utility of the present invention, a brief consideration of a typical conventional converging reflector and a typical conventional liquid crystal display device will be first presented below with reference to FIGS. 14, 15 and 16 principally for the purpose of comparison therebetween.

Figure 14:
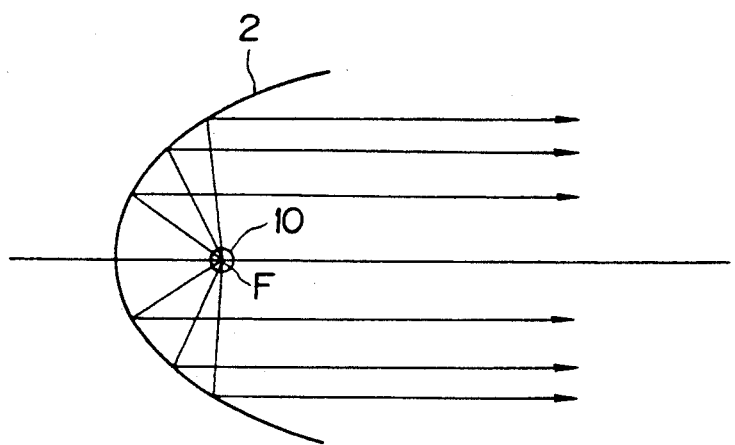
FIGS. 14 and 15 are schematic diagrams showing the configuration of conventional converging reflectors, respectively.
Figure 15:
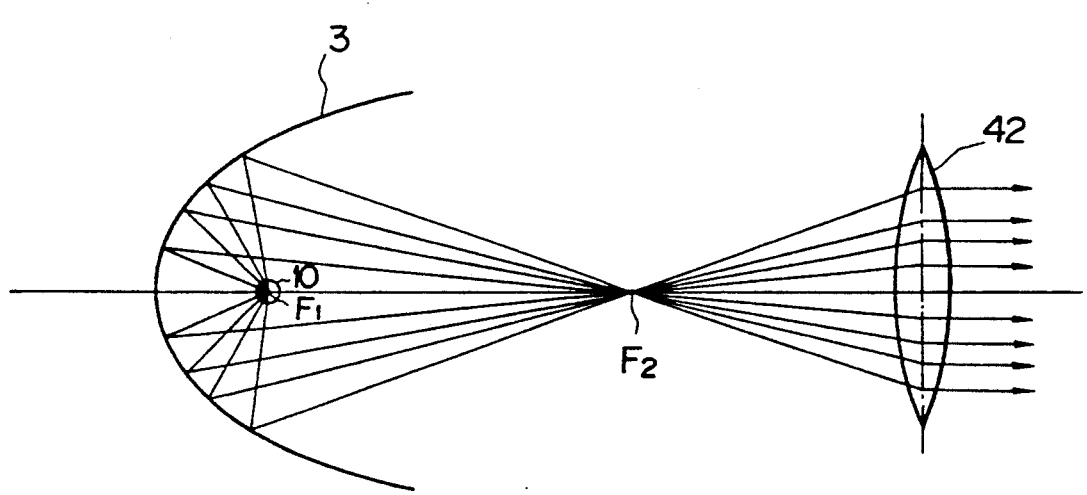

The outlines of the configurations of conventional converging reflectors are shown in FIGS. 14 and 15, respectively.

In FIG. 14, a conventional converging reflector is formed by a reflecting mirror 2 of paraboloid of revolution. A light source 10 is arranged at the focal point F of the paraboloid of revolution. Thus, a light from the light source 10 is reflected as a parallel light by the reflecting mirror 2 of paraboloid of revolution.

On the other hand, in FIG. 15, another conventional converging reflector is formed by a reflecting mirror 3 of ellipsoid of revolution. Light source 10 is arranged at the first focal point $F_1$ of ellipsoid of revolution. A light from the light source 10 is converged into the second focal point $F_2$ by the reflecting mirror 3 of ellipsoid of revolution. The reflected light thus obtained is then changed to a parallel light by a condenser lens 42 whose focal point is coincident with the second focal point $F_2$ of the reflecting mirror 3 and is emitted therefrom.

In the case of the respective conventional converging reflectors, by arranging the point light source 10 at the focal point F (or $F_1$) of each reflecting mirror, it is possible to emit rays of parallel light or rays of convergent light to reflect those rays of light on an ideal circular plane of projection or an ideal point.

However, in an attempt to realize a light source of high luminance or brightness, the light source itself would be large. For example, a metal halide lamp is used as a high luminance one. In the metal halide lamp, a light is emitted between two electrodes in the metal halide lamp. For this reason, such a light source cannot be considered as a point light source and the size of that light source would not be negligible, thus disadvantageously failing to allow a light to be reflected on a circular plane of projection or a point.

Further, since a metal halide lamp of the double tube type employed as the light source mentioned above is of a structure using a large valve as its outer tube, a light reflected by the reflecting mirror impinges on the valve itself, and is scattered and absorbed, disadvantageously resulting in a lowered convergence efficiency.

Figure 16:
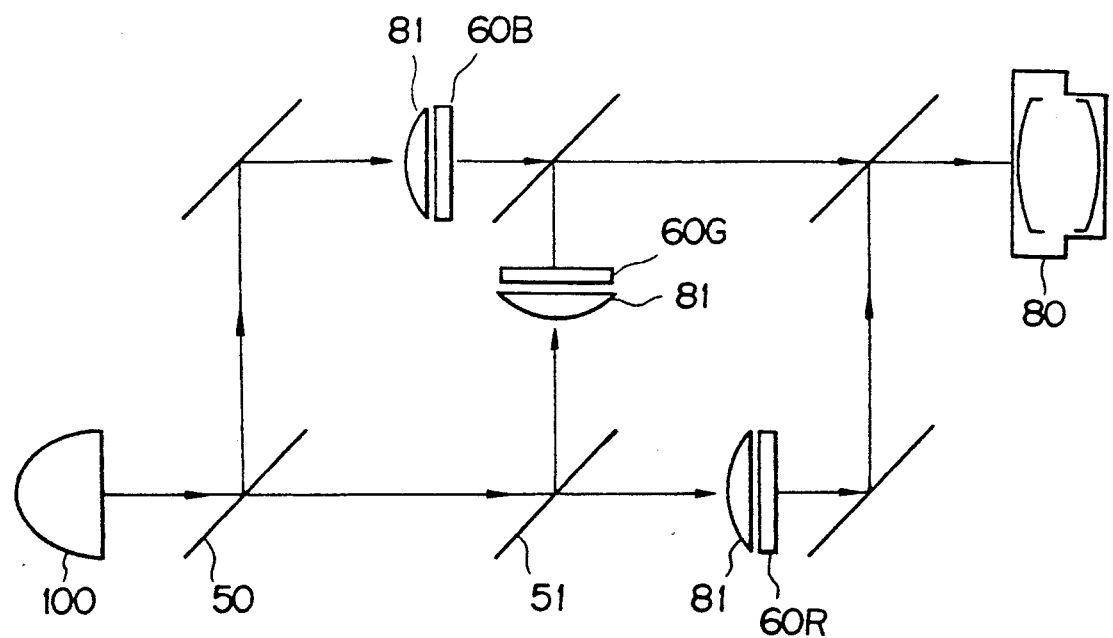
FIG. 16 is a diagram showing the configuration of a conventional liquid crystal display device.

Further, the outline of the configuration of a liquid crystal display device using a conventional converging reflector is shown in FIG. 16. In this figure, this conventional liquid crystal display device is of a structure to separate a white light reflected from a converging reflector 100 into rays of light of three colors of R, G and B by using dichroic mirrors 50 and 51 to allow respective rays of light of R, G and B to be incident onto liquid crystal cells 60R, 60G and 60B through condenser lenses 81. The respective rays of light vary transmittance of the liquid crystal cells 60R, 60G and 60G in dependency upon respective image signals to allow respective rays of incident light of R, G and B to be transmitted therethrough or intercepted thereby to project those rays of light on a screen (of which indication is omitted) through a projection lens 80.

In the case of the conventional liquid crystal display devices, although a light from the converging reflector 100 is projected through the dichroic mirrors 50 and 51, the condenser lens 80, the liquid crystal cells 60R, 60G and 60B, and the projection lens 80, only the convergence efficiency of the converging reflector 100 is taken into consideration, but the correlation of the entirety of the device is not taken into consideration by any means. Thus, the convergence efficiency of the entirety of the device was unable to be improved.

The present invention will now be explained.

(1) First embodiment of this invention

Figure 1:
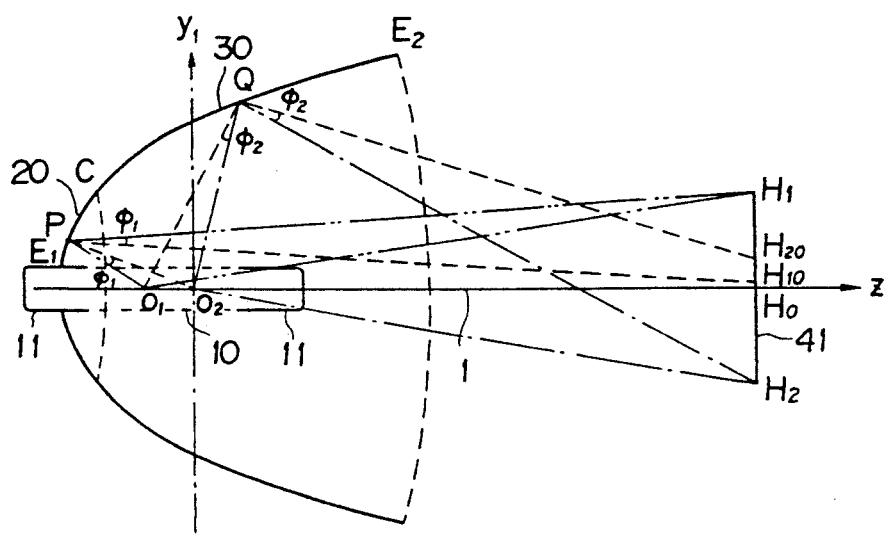
FIG. 1 is a schematic diagram showing the configuration of a converging reflector according to this invention.

A preferred embodiment of this invention will now be described with reference to FIG. 1. FIG. 1 shows the outline of the configuration of a converging reflector of this embodiment.

In this figure, the converging reflector according to this embodiment comprises a metal halide lamp 10 including two electrodes $0_1$ and $0_2$ provided at their respective positions with a space of 5 to 11 mm therebetween, a first elliptic reflecting section 20 comprising a curved surface of ellipsoid of revolution $C-E_1$ having two focal points of the electrode $0_1$ and one end portion $H_1$ of an irradiation plane 41 onto which a light from the metal halide lamp 10 is projected and a second elliptic reflecting section 30 connected, at a contact point C, to the outer peripheral end portion of the first elliptic reflecting section 20. The second section 30 comprises a curved surface of ellipsoid of revolution $C-E_2$ having two focal points of the electrode $0_2$ and the other end portion $H_2$ of the irradiation plane 41.

More particularly, the metal halide lamp 10 is of a structure including two valves 11 each serving as an outer tube provided at both end portions thereof, and two electrodes $O_1$ and $O_2$ each serving as a light emitting section provided between the two valves 11 at the both end portions.

The operation of the converging reflector of this embodiment based on the above-mentioned configuration will now be described with reference to FIG. 2 in connection with the case where it is applied to a liquid crystal display device.

Respective rays of light emitted from the electrodes $O_1$ and $O_2$ of the metal halide lamp 10 are incident onto an arbitrary point P on the curved surface of ellipsoid of revolution C-$E_1$ of the first elliptic reflecting section 20 at an angle $\phi_1$ between the respective rays of light, and are reflected from that arbitrary point P onto a portion located in a region from $H_1$ to $H_{10}$ on the irradiation plane 41 at the angle $\phi_1$ between the respective rays of the reflected light.

That is, this first elliptic reflecting section 20 takes thereinto a light from the light source 10 at an angle $\phi_1$ between the respective rays of incident light to emit it from an arbitrary point P at a small emission angle $\phi_1$ to irradiate the plane of irradiation 41 therewith without being intercepted or screened by the valve 11 of the metal halide lamp 10.

Further, the respective rays of light emitted from the electrodes $O_1$ and $O_2$ are incident, at an angle $\phi_2$ between respective rays of light, onto an arbitrary point Q on the curved surface of ellipsoid of revolution C-$E_2$ of the second elliptic reflecting section 30, and are projected, at an angle $\phi_2$ between the respective rays of light, from that arbitrary point Q onto a portion located in a region from $H_2$ to $H_{20}$ on the irradiation plane 41.

Lights emitted from the portion of the lamp 10 between the electrodes $O_1$ and $O_2$ are projected within the ranges $H_1$ to $H_{10}$ and $H_2$ to $H_{20}$, respectively.

Figure 2:
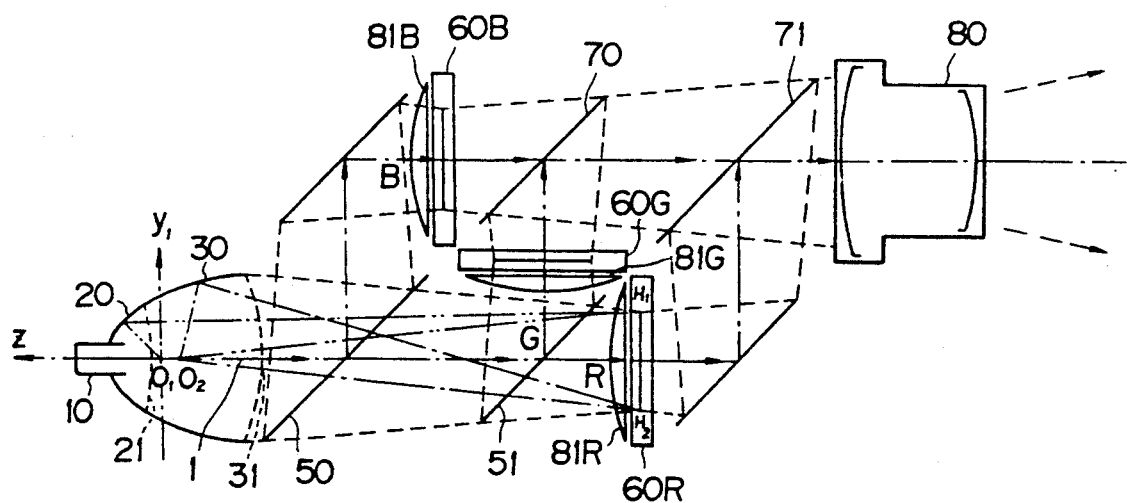
FIG. 2 is a diagram showing the entirety of the configuration in the case where the converging reflector shown in FIG. 1 is applied to a liquid crystal display device.

FIG. 2 shows an example of an application to a liquid crystal projection TV of the above-mentioned converging system.

In this figure, a light from a white light source is separated into rays of light of three colors of R, G and B by using two dichroic mirrors 50 to 51 to form images by using liquid crystal cells 60R, 60G and 60B of which transmittance varies in dependency upon image signals of colors of R, G and B, respectively. These images thus formed are synthesized by using two dichroic mirrors 70 and 71. The light thus synthesized is projected onto a screen (of which indication is omitted) by means of a signal projection lens 80.

Here, when there is employed an arrangement such that the respective liquid crystal cells 60R, 60G and 60B are positioned so as to serve as the irradiation plane 41, light can be efficiently converged.

Further, when the three condenser lens 81R, 81G and 81B each having a focal point at the incident position of the projection lens 80 are arranged on the light source side of the liquid crystal cells 60R, 60G and 60B, respectively, the efficiency of light utilization is further improved.

In this embodiment, there is employed an arrangement such that optical distances from the light source to the cell planes of the liquid crystal cells 60R, 60G and 60B of R, G and B are equal to each other.

(2) Second embodiment of this invention

A second embodiment of this invention will now be described with reference to FIGS. 3 to 7 in conjunction with the above-mentioned FIG. 2.

In these drawings, a converging reflector $R_1$ according to the second embodiment is of a structure comprising the metal halide lamp 10 including the electrodes $O_1$ and $O_2$ provided at the respective positions spaced by a predetermined distance (FIGS. 3 and 6), and first and second elliptic reflecting sections 20a and 30a in a special form, which will be described later, adapted to converge and project a light only onto an area within a square plane 41 of irradiation, and having different focal points $O_1$ and $H_1$, and $O_2$ and $H_2$, respectively.

Figure 4:
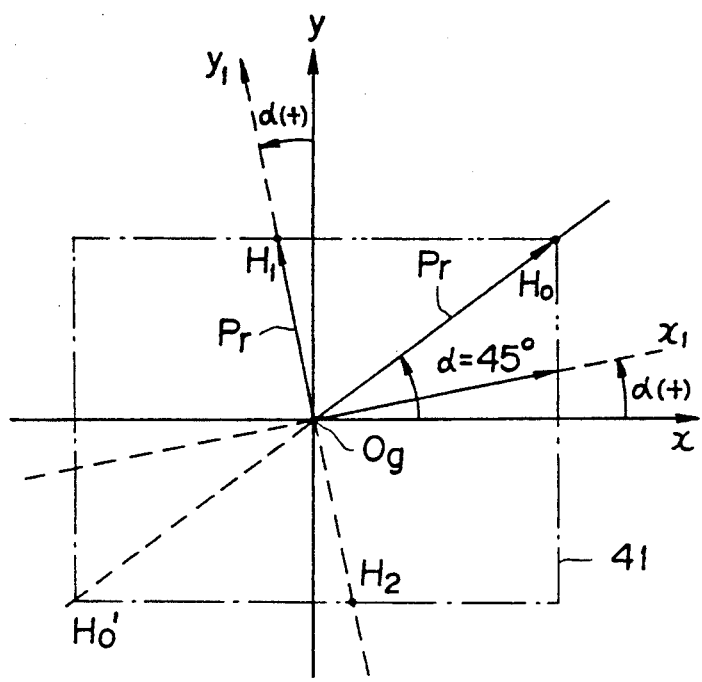
FIG. 4 is a plan view of a plane of irradiation in the x-y coordinates of the optical system according to a second embodiment of this invention.

Assuming now that the square plane 41 of projection is in the form of a rectangle having an aspect (longitudinal-to-lateral) ratio of 3:4, consideration will be made in terms of $x_1$-$y_1$ coordinates given by rotating the x- and y-axes by an angle of $\alpha$ (FIG. 4). That is, consideration will be made in terms of a revolutional plane $P_r$ about the original point $O_g$. In the plane formed by the $y_1$-axis and the z-axis (in correspondence with the optical axis 1 in FIG. 2), the respective end points of the plane 41 of irradiation in the direction of $y_1$-axis are $H_1$ and $H_2$ (corresponding to the end portions of respective display planes of the liquid crystal cells 60R, 60G and 60B in FIG. 2).

The first and second elliptic reflecting sections 20a and 30a in a special form are formed, for example, in the following manner with reference to FIG. 6.

First, a reference elliptic curved surface $E_1$-$E_2$ (FIG. 6) is obtained, when the revolutional plane $P_r$ is rotated to an angular position of $\alpha=45°$ (FIG. 4), a distance between the origin $O_g$ and an intersection point $H_0$ is maximum in comparison with other cases that the revolutional plane $P_r$ is rotated to a position rather than that of $\alpha=45°$. An elliptic curved surface in the case of $\alpha=45°$ is the reference elliptic curved surface $E_1$-$E_2$.

Figure 6:
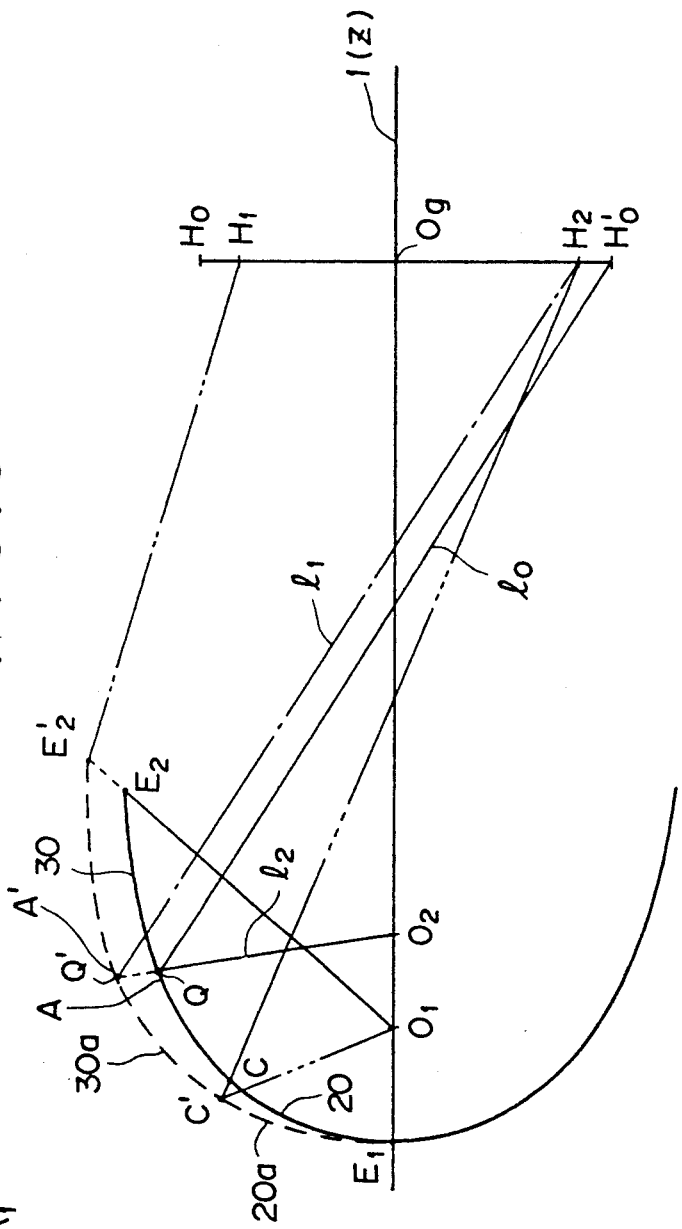
FIG. 6 is an explanatory view to obtain a curved reflection surface for condensing a light onto the irradiation plane.

In FIG. 6, a light emitted from the focal point $O_2$ and reflected from an arbitrary point Q on the second elliptic reflecting section 30 must be condensed to an intersection point $H_0$ while a light emitted from the focal point $O_1$ and reflected from an arbitrary point (not shown) on the first elliptic reflecting section 20 must be condensed to an intersection point $H_0$. In contrast, a light emitted from the focal point $O_1$ and reflected from the second section 30 must be scattered within a range of $H_0$-$H_0'$ and, further, a light emitted from the focal point $O_2$ and reflected from the first section 20 must be also scattered within a range of $H_0'$-$H_0$.

Figure 3:
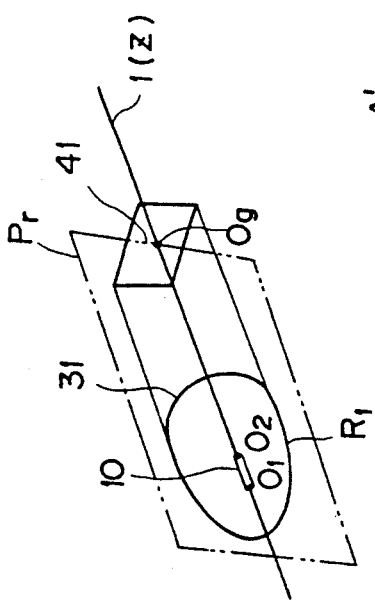
FIG. 3 is a perspective view showing a state wherein a reflected light of the converging reflector is condensed to an irradiation plane.

Secondly, consideration is made to a case that the revolutional plane $P_r$ is rotated to an angular position of $\alpha$. At this time, the plane $P_r$ intersects the outer edge of the irradiation plane 41 at two points $H_1$ and $H_2$. The distance between the two points $H_1$ and $H_2$ is smaller than the distance between the points $H_0$, $H_0'$ as shown in FIG. 6. and the two points $H_1$ and $H_2$ are positioned inside of the two points $H_0$ and $H_0'$, respectively. In this case, a light emitted from the focal point $O_2$ and reflected on a second elliptic section 30a is condensed to the point $H_2$ and a light emitted from the focal point $O_1$ and reflected on a first elliptic section 20a is condensed to the point $H_1$. In order to obtain the second elliptic section 30a, a parallel line 11 parallel to a line Q-$H_0'$ is drawn to obtain an intersection point Q' at which the parallel line 11 intersects a line 12. A tangential line A is formed at the point Q and then a parallel line A' parallel to the tangential line A is drawn. Such a line A' is formed with respect to every point of the second section 30 and every tangential line thus obtained is connected to form the second elliptic section 30a. Light emitted from the portion of the lamp 10 between the electrodes $O_1$ and $O_2$ are condensed to a region within the two points $H_1$ and $H_2$. In the same manner as described above, the first elliptic section 20a can be formed. Such an elliptic curved surface is formed with respect to a case that the revolutional plane $P_r$ is rotated in a range of 360° to form the reflector $R_1$, as shown in FIGS. 3 and 7 which can condense all light emitted from the lamp 10 within the rectangular irradiation plane 41. In FIG. 3, a numeral number 31 shows an inlet of the reflector $R_1$.

Figure 5:
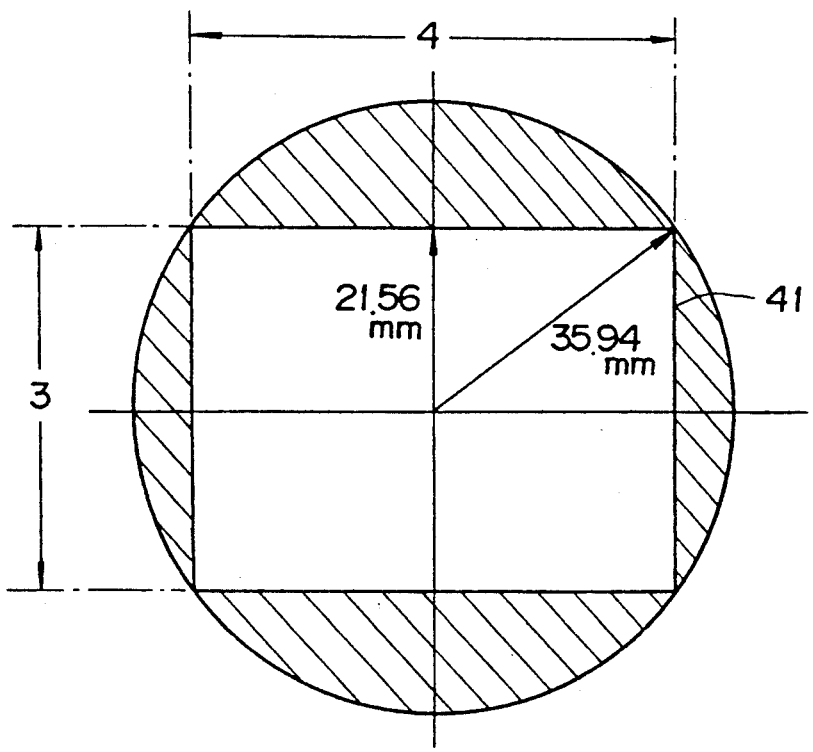
FIG. 5 is an explanatory view showing the outside dimension of the plane of irradiation in FIG. 4.

The first and second elliptic reflecting sections 20a and 30a formed so as to take a special form as stated above serve to eliminate the possibility that light is projected to the slanting line portions in FIG. 5 except for the square plane 41 of irradiation. Thus, convergent irradiation can be conducted with a high efficiency.

Figure 7A:
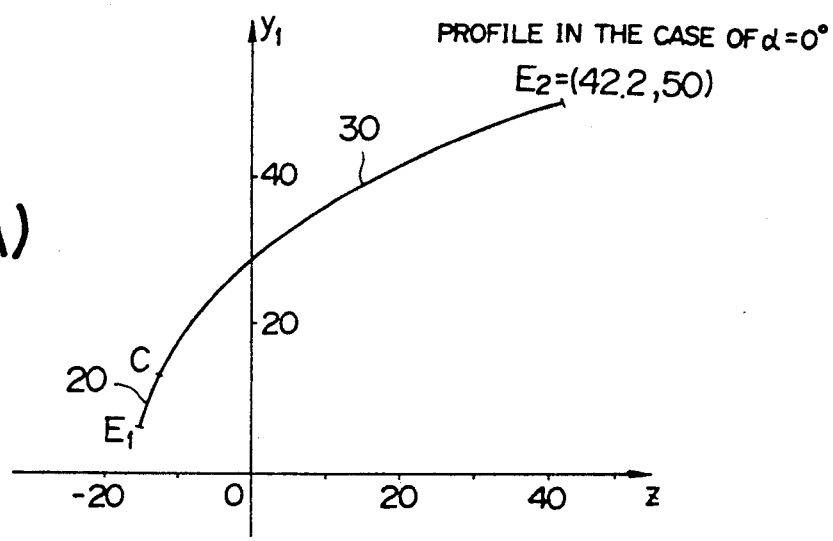
FIG. 7(A) is a diagram showing the reflector profile in the case where α is 0 degree.
Figure 7B:
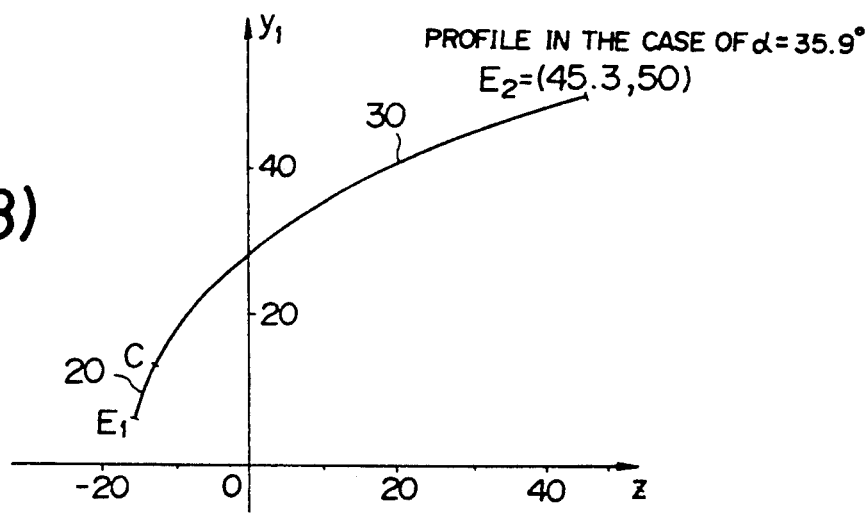
FIG. 7(B) is a diagram showing the reflector profile in the case where α is 35.9 degrees.
Figure 7C:
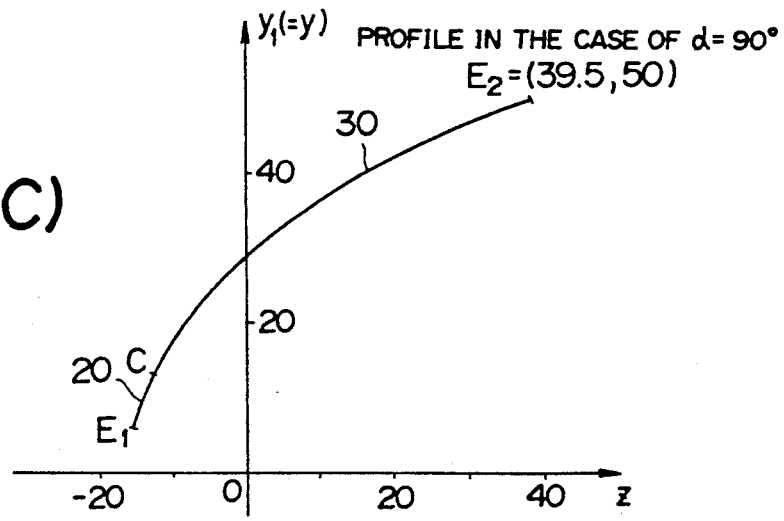
FIG. 7(C) is a diagram showing the reflector profile in the case where α is 90 degrees.

However, as an actual problem, when attention is drawn to projection of light onto a square plane by the converging reflector $R_1$, where the cross section of the revolutional plane at an arbitrary position along the z-axis of the converging reflector $R_1$ is not circular, an offset in a radial direction would occur in the rays of reflected light. However, in the case that the cross section of the x-and y-axes at the arbitrary position is elliptic that the plane of projection, in FIG. 5, has an aspect ratio of 4:3 and that the lamp having an arc length 5 mm is placed so that its electrode $0_1$ is spaced from the origins $0_1$ and $0_2$ by 350 mm, the partial profile (cross section) of the converging reflector $R_1$ is as shown in FIGS. 7(A), 7(B) and 7(C). It is seen from these figures that the profile is nearly circular even if an angle $\alpha$ between the $y_1$-axis and the y-axis is 0, 39.5 or 90 degrees. Accordingly, an offset in a radial direction does not constitute a great problem.

While the light source is comprised of a metal halide lamp in the above-mentioned respective embodiments, it may be comprised of other light sources as a point light source, a linear light source, or an area light source, etc..

(3) Third embodiment of this invention

Figure 8:
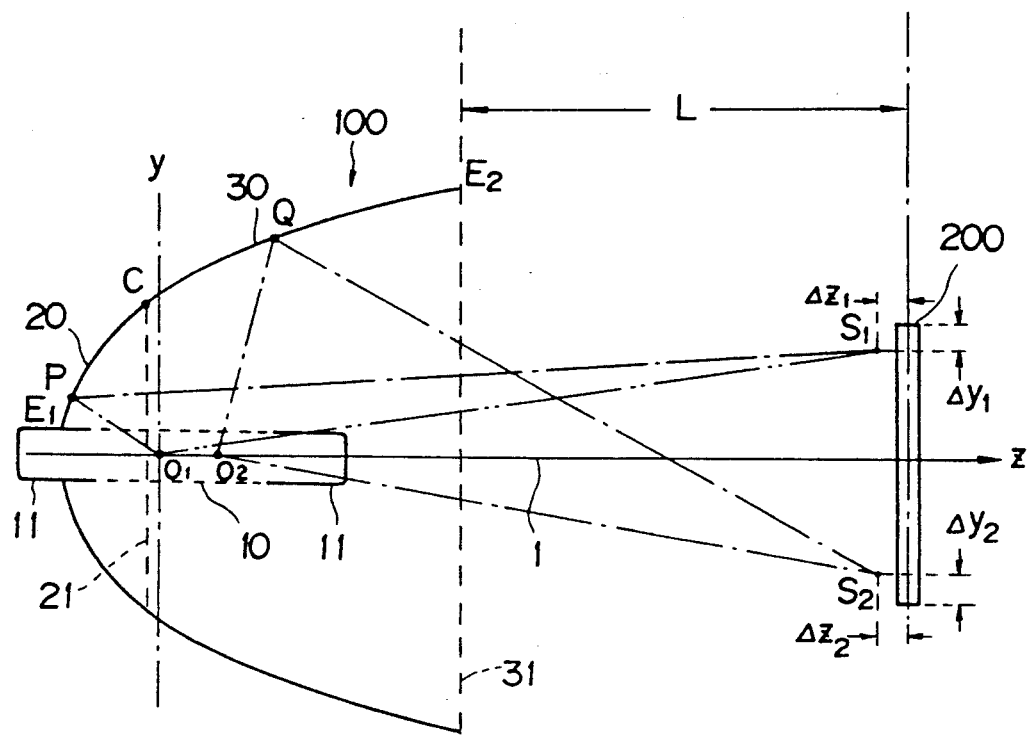
FIG. 8 is an explanatory view of a third embodiment of this invention.

FIG. 8 is an explanatory view showing the essential part of a liquid crystal display device of a third embodiment according to this invention.

In this drawing, the liquid crystal display device of this embodiment comprises, in the same manner as in the invention shown in FIG. 1, a converging reflector 100 in which the first reflection surface 20 formed by the curved surface of ellipsoid of revolution C-$E_1$ and the second reflection surface 30 formed by the curved surface of ellipsoid of revolution C-$E_2$ are arranged adjacently to each other, and a liquid crystal panel 200 for allowing a light from the converging reflector 100 to be selectively transmitted therethrough.

The converging reflector 100 is formed so that the space between the electrodes $0_1$ and $0_2$ of the metal halide lamp 10 is 5 to 7 mm, and the aperture of the reflector 100 is 100±20 mm. Further, the liquid crystal panel 200 is formed so that the effective displayable screen size is 2.8 to 3.3 inches.

In this arrangement, each contact point C on the connection line 21 of the first and second reflection surfaces 20 and 30 of the converging reflector 100 is positioned within a range of y=±30±5 and z=0±5 in the y-z coordinate system which is formed of a z-coordinate axis in correspondence with the optical axis 1 of a light projected from the converging reflector 100 onto the liquid crystal panel 200 and a y-coordinate axis perpendicular to the z-coordinate axis at the position of the electrode $0_1$ on the z-coordinate axis.

Further, there is employed an arrangement such that other focal points $S_1$ and $S_2$ of the first and second reflection surfaces 20 and 30 are positioned in a manner that they are spaced by distances $\Delta z_1$ and $\Delta z_2$ from the plane of convergent projection of the liquid crystal panel 200 to the side of converging reflector 100 and by distances $\Delta y_1$ and $\Delta y_2$ from the end portion of the liquid crystal panel 200 to the inside (z-axis side), respectively. The distances $\Delta z_1$ and $\Delta z_2$ are set within 50 mm, respectively, and the distances $\Delta y_1$ and $\Delta y_2$ are set within 2 mm, respectively.

As described above, since the liquid crystal display device is constructed in consideration of mutual relationships of the converging reflector 100 and the liquid crystal panel 200, the convergence efficiency of the liquid crystal display device can be improved by 20% or more as compared to that of the above conventional device.

(4) Fourth embodiment of this invention

Figure 9:
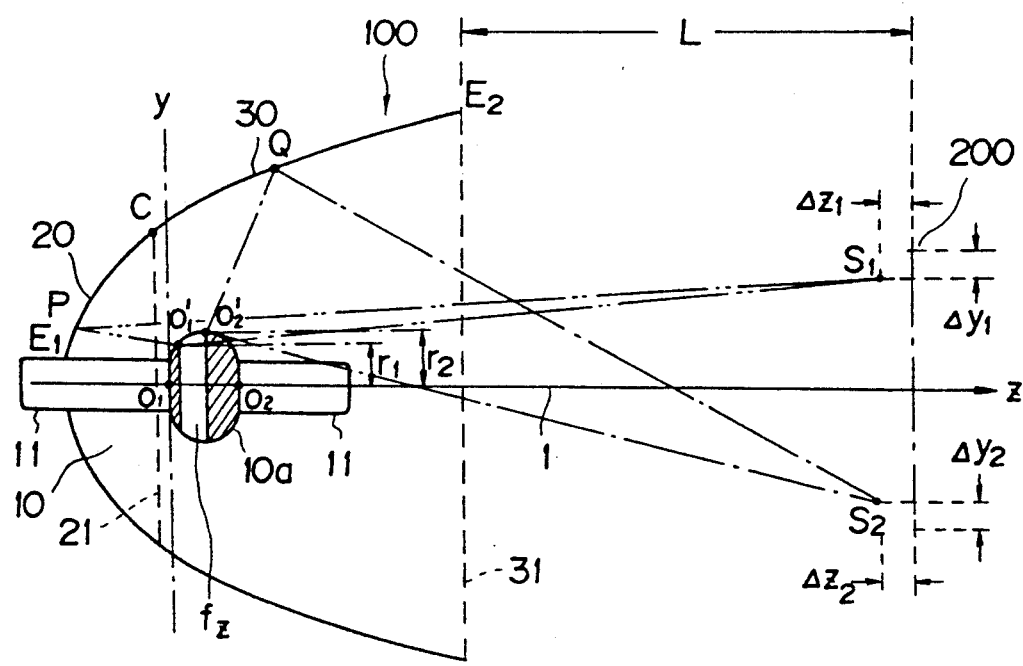
FIG. 9 is an explanatory view of a fourth embodiment of this invention.

FIG. 9 shows a fourth embodiment of this invention. In FIG. 9, a linear light source comprised of the electrodes $O_1$ and $O_2$ is used as the light source of the converging reflector 100. In FIG. 9, a frosted metal halide lamp 10 is used, and this lamp 10 has a deformed spherical tube 10a. The tube 10a is covered, at its front and rear portions, with screening films, and a frosted zone fz is formed between the screening zones. The focal points $O_1'$ and $O_2'$ are positioned on the opposite sides of the frosted zone. In this case, the first and second reflection surfaces 20 and 30 of the reflector 100 are formed so as to have two focal points $O'_1$ and $O'_2$ separated from each other on the circumferential surface of the tube 10a. The focal point $O'_1$ is separated by a distance $r_1$ from the z-axis and the focal point $O'_2$ is separated by a distance $r_2$ therefrom.

That is, the first and second reflection surfaces 20 and 30 of the converging reflector 100 have the focal points $O'_1$ and $O'_2$ and the other focal points $S_1$ and $S_2$, respectively.

It is to be noted that, in the same manner as in the invention shown in FIG. 9, the first and second reflection surfaces 20 and 30 are of a structure such that the other focal points $S_1$ and $S_2$ are positioned slightly closer to the side of converging reflector 100 relative to the plane of the convergent projection of the liquid crystal panel 200 and slightly inside of the convergent projection plane.

This structure also enables the increase of convergence efficiency.

(5) Fifth embodiment of this invention

Figure 10:
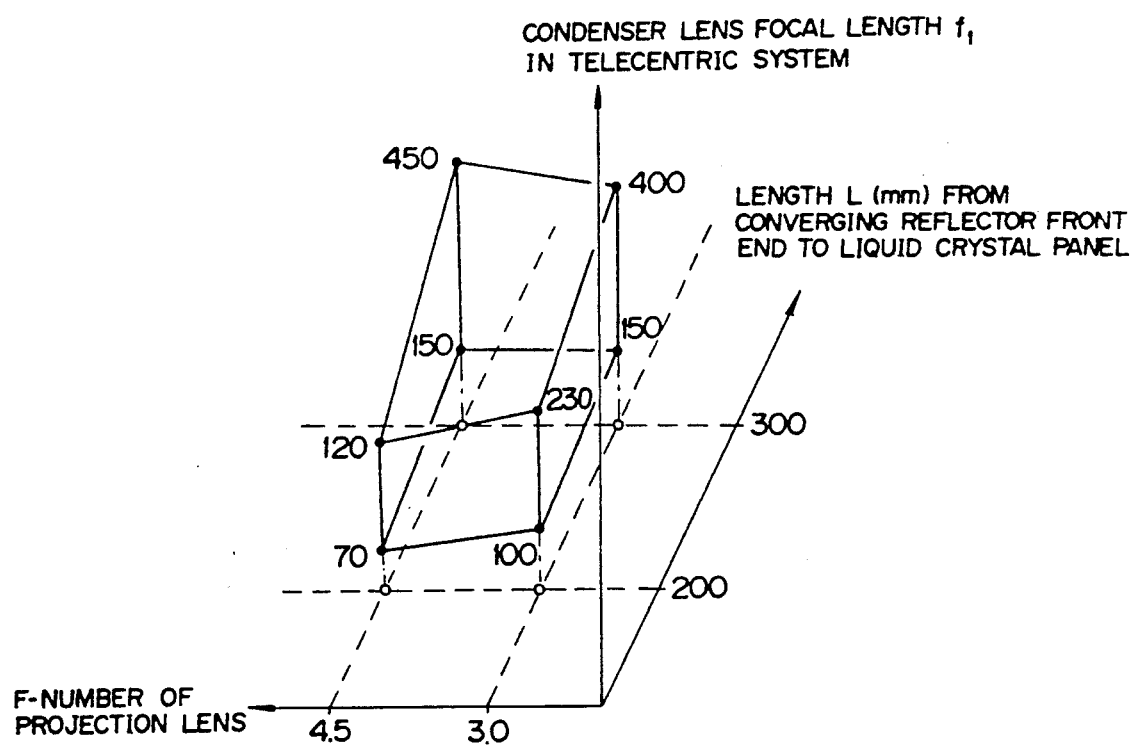
FIG. 10 is a diagram showing a relationship of an F-number, a length, and a focal length in a telecentric system of a fifth embodiment of this invention.

FIG. 10 is a diagram showing the relationship of F-number, length and focal length of a condenser lens, in a telecentric system.

The liquid crystal display device according to this embodiment includes, in the same manner as in the invention shown in FIG. 9, the converging reflector 100 and the liquid crystal panel 200. In addition to this arrangement, this device further includes three condenser lenses corresponding to the condenser lens 81R, 81G and 81B (FIG. 2) and a projection lens corresponding to the convergent projection lens 80 for projecting a light emitted from the liquid crystal panel 200 onto a plane of projection (of which indication is omitted).

The following mutual relationship between the F-number of the projection lens, the length L from the aperture end 31 of the converging reflector 100 to the liquid crystal panel 200 and the focal length $f_1$ of the condenser lenses is desirable.

In the area where the F-number of the coordinate plane of the F-number—length L is 3.0 to 4.5, and the length L in that plane is 200 to 300 mm in the three-dimensional coordinate system of the F-number, the length L and the focal length $F_1$, when the F-number is 3.0 and the length L is 200 mm, the focal length $F_1$ is set in a range of 100 to 230 mm, when the F-number is 3.0 and the length L is 300 mm, the focal length $f_1$ is set in a range of 150 to 400 mm, when the F-number is 4.5 and the length L is 200, the focal length $f_1$ is set in a range of 70 to 120 mm, and when the F-number is 4.5 and the length L is 300 mm, the focal length $f_1$ is set in a range of 150 to 450 mm.

When setting is made in connection with the above-mentioned respective F-number, length L and focal length $f_1$ in this way, a high convergence efficiency and a uniform illuminance distribution are provided over the entirety of the device with respect to the diagonal direction of the liquid crystal panel 200. The relationship can be similarly determined with respect to any direction of the liquid crystal panel 200.

In FIG. 10, the projection lens is arranged in the telecentric system where an optical position is infinite. In addition, the relationship between an actual projection lens and the condenser lenses in the non-telecentric system can be expressed as follows.

$$(1/f) = (1/f_1) + (1/l)$$

where f is a focal length of each of the actually used condenser lenses and l is a position of the optical position of the actually used projection lens.

In the above-mentioned equation, in the case of the telecentric system, the length l becomes equal to $\infty$ and the focal length f is equal to $f_1$.

As stated above, by taking into consideration the convergence efficiency over the entirety of the optical system comprising the converging reflector 100, the liquid crystal panel 200 and the projection lens 80 (see FIG. 2), the light utilization efficiency of the entirety of the device can be improved.

It is to be noted that this embodiment may be assembled together with the fourth embodiment in which the frosted light emitting tube 10a is used.

(6) Sixth embodiment of this invention

Figure 11:
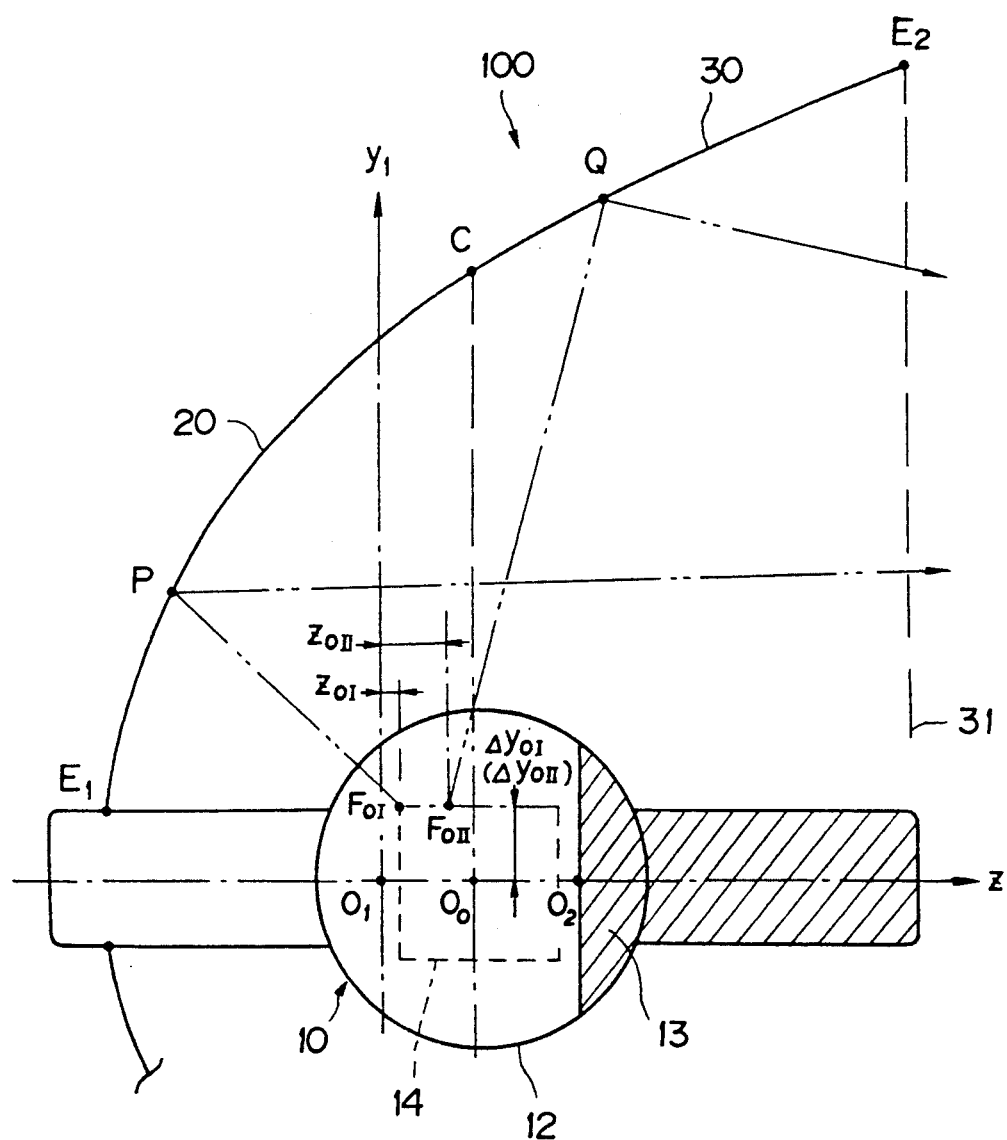
FIG. 11 is an explanatory view showing the detail of a converging reflector portion of a sixth embodiment of this invention.

FIG. 11 shows a device of a sixth embodiment. In this drawing, the liquid crystal display device according to this embodiment includes, as respective common components, in the same manner as in the above-described respective inventions, a converging reflector 100 including a metal halide lamp 10, a liquid crystal panel 200, a condenser lens (of which indication is omitted), and a projection lens 80. This embodiment differs from the above-described respective inventions in the configurations of the metal halide lamp 10, the converging reflector 100, the condenser lens 81, and the projection lens 80 (see FIG. 2).

The metal halide lamp 10 is of a structure such that the space 1 between a pair of electrodes $O_1$ and $O_2$ is 5.0 to 7.0 mm, that the outer periphery of the pair of electrodes $O_1$ and $O_2$ is enveloped by a light emitting tube 12 of a relatively thin frosted semitransparent spherical body, and that zirconium oxide film (hatched portion in FIG. 11) is coated on the projection side portion of the light emitting tube 12. The zirconium oxide film 13 on the light emitting tube 12 is coated on the light projection side region on the light emitting tube 12 partitioned by a plane perpendicular to the z-axis passing through the pair of electrodes $O_1$ and $O_2$. The partitioning plane passes through the electrode $O_2$. Thus, the service life of the light source is prolonged and the light emitting efficiency is improved.

Further, the converging reflector 100 is of a structure such that the aperture 31 on the irradiation side of the second elliptic reflecting section 30 having the second reflection surface $C$-$E_2$ is $100 \pm 20$ mm, that the first back side focal point $F_{0I}$ of the first reflection surface $C$-$E_1$ has a coordinate ($1.5 \pm 1.0$ mm, $0 \pm 0.5$ mm) in the $y_1$-z coordinate system in which the electrode $O_1$ is the origin, and that the second back side focal point $F_{0II}$ of the second reflection surface $C$-$E_2$ has a coordinate ($1.5 \pm 1.0$ mm, $1.0 \pm 0.5$ mm) in the $y_1$-z coordinate system.

Furthermore, the liquid crystal panel 200 is of a structure such that its display area is 43 mm $\times$ 58 mm (2.8 inches $\times$ 3.3 inches), and that the length L from the end portion $E_2$ of the converging reflector 100 is 200 to 300 mm. The condenser lens is of a structure such that it is arranged in the vicinity of the light incident side of the liquid crystal panel 200, and that the focal length is 250 to 500 mm. In addition, the projection lens 80 is of a structure such that its F-number is 3.0 to 3.5 mm, and that it is formed as a telecentric system.

The operation of the device of this embodiment based on the above described configuration will now be described. When the metal halide lamp 10 is lighted by discharging between a pair of electrodes $O_1$ and $O_2$, it can be considered to be a virtual light source 14 (indicated by dotted lines in FIG. 11) in a form rectangular in cross section ($\Delta y_{0I} = \Delta y_{0II} = 1.5 \pm 1.0$ mm) where the luminous intensity distribution is maximum by the action of the light emitting tube 12 of a relatively thin semitransparent body.

Specific respective points on the virtual light source 14 serve as the first back side focal point $F_{0I}$ for the first reflection surface $C$-$E_1$ and serve as the second focal point $F_{0II}$ for the second reflection surface $C$-$E_2$, respectively. A light reflected at the point P on the first elliptic reflecting section 20 having the first reflection surface $C$-$E_1$ is projected, with a high efficiency, onto the liquid crystal panel 200 through the condenser lens 81. In addition, a light reflected at the point Q on the second elliptic reflecting section 30 having the second reflection surface $C$-$E_2$ will be similarly projected onto the liquid crystal panel 200. The state of the liquid crystal panel 200 onto which a light is projected with a high efficiency will now be described in accordance with the experimental data.

Figure 13A:
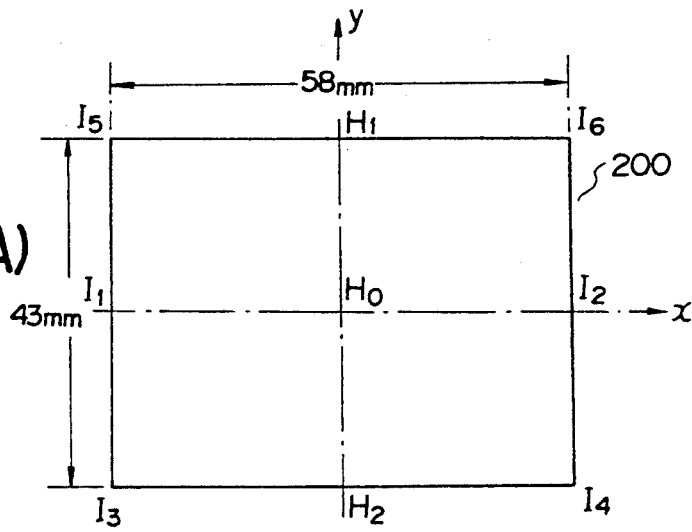
FIG. 13(A) is a plan view showing a form of the appearance of the liquid crystal panel.
Figure 13B:
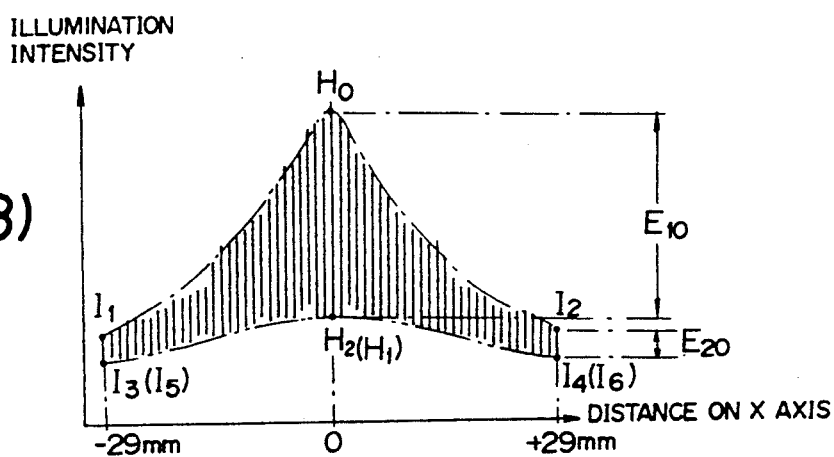
FIG. 13(B) is a characteristic diagram of the experimental data of the illumination intensity distribution of the conventional device.
Figure 13C:
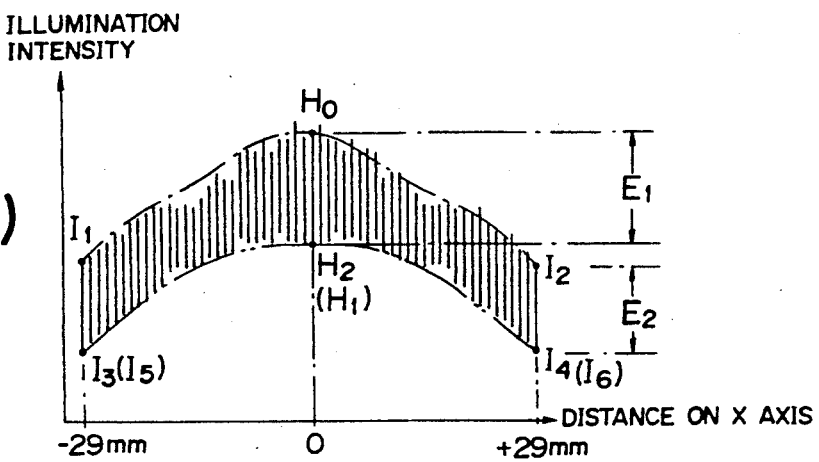
FIG. 13(C) is a characteristic diagram of the experimental data of the illuminous distribution in this invention.

The characteristic diagram of the experimental data of the illumination intensity distribution on the liquid crystal panel 200 is shown in FIG. 13. FIG. 13(A) is a plan view showing a form of the appearance of the liquid crystal panel 200, FIG. 13(B) is a characteristic diagram of the experimental data of the illumination intensity distribution of the conventional device, and FIG. 13(C) is a characteristic diagram of the experimental data of the illumination intensity distribution of the device according to this embodiment. FIGS. 13(B) and 13(C) show the illumination intensity distributions of $I_1$-$H_0$-$I_2$ and $I_3$-$H_2$ $I_4$ (or $I_5$-$H_1$-$I_6$) in the x-axis direction of the liquid crystal panel 200, respectively. In the FIG. 13(B) showing the characteristic of the conventional device, the illumination intensity difference $E_{10}$ between $H_0$ and $H_2$ (or $H_1$) on the liquid crystal panel 200 greatly differs from the illumination intensity difference $E_{20}$ between $I_1$ and $I_3$ ($I_5$), or $I_2$ and $I_4$ ($I_6$). On the other hand, in the diagram of FIG. 13(C) showing the characteristic of this embodiment, the illumination intensity difference $E_1$ between $H_0$ and $H_2$ ($H_1$) on the liquid crystal panel 200 is substantially equal to the illumination intensity difference $E_2$ between $I_1$ and $I_3$ ($I_5$) or $I_2$ and $I_4$ ($I_6$). Thus, irradiation is implemented to the entire surface of the liquid crystal panel 200 in accordance with a uniform illumination intensity distribution. As a result, unevenness of an image on the entirety of the screen is improved and the light utilization efficiency of the entirety of the device is improved.

In the above mentioned embodiment, the projection lens 80 employs the telecentric system where the optical position is infinite. On the other hand, in the case of an actual projection lens 80 of the non-telecentric system, the relationship with respect to the condenser lens 81 (81R, 81G, 81B as shown in FIG. 2 in the case of a color liquid crystal display device) can be expressed by the following equation.

$$(1/f) = (1/f_1) + (1/l)$$

where f is a focal length of a condenser lens 81 actually used and l is a length up to the eye position of a projection lens 80 actually used. In the above equation, in the case of the telecentric system, the relationship is expressed as $l = \infty$ and $f = f_1$.

(7) Seventh embodiment of this invention

The configuration of the liquid crystal display device according to a seventh embodiment differs from that of the sixth embodiment in that the positions of another first and second front side focal points $F_{1I}$ and $F_{1II}$, on the liquid crystal panel 200 side, of the first and second elliptic reflecting sections 20 and 30 are numerically limited as follows.

The first elliptic reflecting section 20 is of a structure such that the first front side focal point $F_{1II}$ for the first reflection surface (C-$E_1$) of the first elliptic reflecting section 20 has coordinates ($F_{1Iy}$, $F_{1Iz}$) spaced by $\Delta y_1 = -5$ to $-20$ mm in the $y_1$-axis direction and by $\Delta z_1 = 50$ to 150 mm in the z-axis direction from coordinates ($H_{1y}$, $H_{1z}$) of the end portion ($H_1$) of the liquid crystal panel 200 in the $y_1$-z coordinate system in which the electrode $O_1$ of the metal halide lamp 10 is the origin.

The second elliptic reflecting section 30 is of a structure such that the second front side focal point ($F_{1II}$) for the second reflection surface (C-$E_2$) has coordinates ($F_{1y}$, $F_{1z}$) spaced by $\Delta y_2 = -5$ to $-20$ mm in the $y_1$-axis direction and by $\Delta z_2 = 50$ to 150 mm in the z-axis direction from the coordinates ($H_{1y}$, $H_{1z}$) of the end portion ($H_1$) of the liquid crystal panel 200 in the $y_1$-z coordinate system.

In addition, the coordinate value $F_{1Iy}$ in the $y_1$ axis direction at the first front side focal point ($F_{1I}$) and the coordinate value $F_{1IIy}$ in the $y_1$ axis direction at the second front side focal point ($F_{1II}$) satisfy a condition expressed as $F_{1Iy} \geq F_{1IIy}$.

Figure 12:
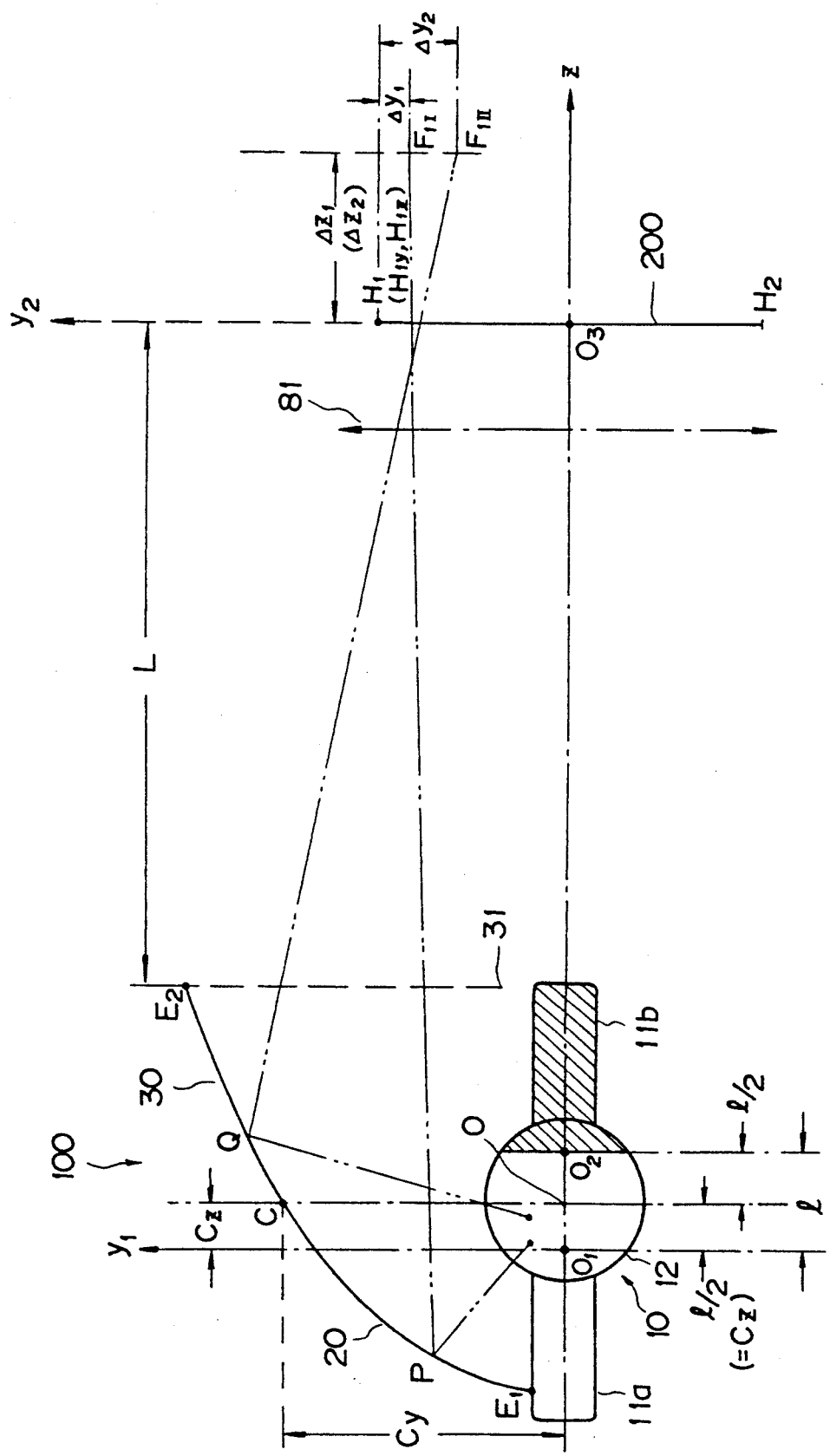
FIG. 12 is an explanatory view showing the detail of a converging reflector and a liquid crystal panel of a seventh embodiment of this invention.

In accordance with the embodiment based on the above described configuration, as shown in FIG. 12, the luminous distribution on the liquid crystal panel 200 becomes uniform. Thus, unevenness of an image and the light utilization efficiency are improved more than those in the above mentioned embodiments.

(8) Eighth embodiment of this invention

The configuration of the liquid crystal display device according to an eighth embodiment differs from those of the above mentioned sixth and seventh embodiments in that the first and second elliptic reflecting sections 20 and 30 are arranged so that the connection point C of the first reflection surface C-$E_1$ and the second reflection surface C-$E_2$ is positioned on a line which is perpendicular to the z-axis in the $y_1$-z coordinate system and passes through the center point $O_0$ of the two electrodes $O_1$ and $O_2$ (FIG. 12). In the $y_1$-z coodinate system, the electrode $O_1$ is the origin.

The coordinates ($C_y$, $C_z$) of the above mentioned connection points C can fall within the following range.

$$C_y = 25.0 \pm 3.0 \text{ mm}$$

$$C_z = (l) \pm 1.0 \text{ mm}.$$

Since respective two reflecting sections 20 and 30 are connected at the connection position described above to constitute the converging reflector 100, light can be projected onto the liquid crystal panel 200 with a higher efficiency.

It is to be noted that this embodiment is constituted on the basis of the configurations of the sixth and seventh embodiments, but may be constituted on the basis of the other embodiments.

As described above, this invention has an arrangement such that rays of light from a linear light source are reflected on the first and second reflection surfaces having different curvatures, which have different focal points, respectively. Accordingly, rays of light are incident from the linear light source onto the first and second reflection surfaces. Thus, light can be converged onto an ideal circular plane of projection or an ideal point, thus advantageously improving the projection efficiency.

Further, the invention described above employs a combination of a liquid crystal panel in a specific form and a converging reflector in a specific form, and the connection point of the first and second reflection surfaces at a specific position. Thus, the correlation between the respective components is satisfied, advantageously improving the convergence efficiency of the entirety of the device.

In addition, in the invention described above, the convergence efficiency is taken into consideration over the entirety of the optical path, thereby advantageously improving the convergence efficiency of the entirety of the device.

In addition, in the invention described above, respective two focal positions are limited to specific positions to thereby satisfy the mutual relationship between the respective components. Thus, the convergence efficiency of the entirety of the device is advantageously improved.

What is claimed is:

1. A converging reflector, comprising:
   a linear light source having two end points positioned with a predetermined space therebetween;
   a first reflection surface having a first curvature so that one of the two end points forms a focal point thereof; and
   a second reflection surface arranged adjacently to said first reflection surface, and having a second curvature so that the other of the two end points forms a focal point thereof, wherein said first and second reflection surfaces are coaxially disposed around an optical axis of said converging reflector, said first reflection surface being disposed adjacent a vertex of said converging reflector, and said second reflection surface being disposed adjacent an opening of said converging reflector.

2. A converging reflector, comprising:
a linear light source having two end points positioned with a predetermined space therebetween;
a first reflection surface having a curvature so that one of the two end points forms a focal point thereof; and
a second reflection surface arranged adjacently to said first reflection surface, and having a second curvature so that the other of the two end points forms a focal point thereof,
wherein said linear light source comprises a metal halide lamp, said metal halide lamp having first and second end portions, said lamp comprising first and second valves provided at said first and second end portions, respectively, and first and second electrodes serving as a light emitting section provided between said first and second valves at said first and second end portions, respectively.

3. A converging reflector, comprising:
a linear light source having two end points positioned with a predetermined space therebetween;
a first elliptic reflection surface having one focal point at one of the two end points of the linear light source and a second focal point at one end portion of a plane of irradiation for projecting a light from said linear light source; and
a second elliptic reflection surface arranged adjacently to said first elliptic reflection surface, and having one focal point at one of the two end points and a second focal point at a second end portion of said plane of irradiation.

4. A converging reflector as set forth in claim 1, wherein said first and second reflection surfaces are formed so as to project a light emitted from said linear light source only onto a rectangular plane of irradiation.

5. A converging reflector as set forth in claim 3, wherein a contact point of said first and second reflection surfaces is positioned on a line which is perpendicular to an optical axis and passes through a center point of said two end points of the linear light source.

6. A liquid crystal display device, comprising:
a converging reflector with a linear light source having two end points positioned with a predetermined space therebetween;
a first reflection surface having a curvature so that one of the two end points forms one focal point, and a second reflection surface arranged adjacently to said first reflection surface and having a second curvature so that a second of the two end points forms one focal point; and
a liquid crystal panel for selectively passing a light reflected from said converging reflector,
wherein a contact point of said first and second reflection surfaces is positioned in the vicinity of a plane which is perpendicular to an optical axis of light reflected from said converging reflector onto said liquid crystal panel, and which passes through said one of said two end points of the linear light source, and
wherein other focal points of said first and second reflection surfaces are positioned between said light source and a plane of convergent projection of said liquid crystal panel, in a position relatively closer to said plane of convergent projection of said liquid crystal panel than said light source and inwardly of first and second ends of said plane of convergent projection of said liquid crystal panel, respectively.

7. A liquid crystal display device as set forth in claim 6, wherein said linear light source comprises a metal halide lamp, said metal halide lamp having first and second end portions, and comprising first and second valves provided at first and second end portions of said metal halide lamp, and said metal halide lamp further comprising first and second electrodes each serving as a light emitting section provided between said first and second valves at the first and second end portions of said metal halide lamp.

8. A liquid crystal display device as set forth in claim 6, wherein said contact point of the first and second reflection surfaces is positioned in a range of about 5 mm in one of a first and second direction away from said perpendicular plane when a distance between said one end point and the contact point is about 30 mm.

9. A liquid crystal display device as set forth in claim 6, wherein said other focal points of said first and second reflection surfaces are positioned in a range within 50 mm from the plane of convergent projection of said liquid crystal panel and within 2 mm from end portions of said plane of convergent projection.

10. A liquid crystal display device as set forth in claim 6, wherein said linear light source in said converging reflector has a light emitting tube in the form of a deformed sphere, two curved surfaces of said first and second reflection surfaces being formed so as to have two focal points separated from each other at a circumferential surface of said tube.

11. A liquid crystal display device, comprising:
a converging reflector provided with a linear light source having two end points located with a predetermined space therebetween, a first reflection surface having a curvature so as to have a focal point at one of the two end points and a second reflection surface arranged adjacently to the first reflection surface and having a second curvature so as to have a focal point at the other of the two end points;
a liquid crystal panel for passing selectively a light reflected from said converging reflector;
a condenser lens provided between said converging reflector and said liquid crystal panel; and
a projection lens for projecting, onto a plane of projection, a light emitted from said liquid crystal panel,
wherein said device is formed so that a space between said two end points of said linear light source in said converging reflector is about 6 mm, an aperture of the converging reflector is about 100 mm, and an effective display size of said liquid crystal panel is about 3 inches,
wherein in a region where an F-number in an F-number—length coordinate plane indicated by a F-number of said projection lens and a length from an end of said aperture of the converging reflector to said liquid crystal panel is 3.0 to 4.5 and the length in said F-number—length coordinate is 200 to 300 mm, a coordinate axis perpendicular to said F-number—length coordinate plane is set as a focal length of said condenser lens,
wherein, in said region, when the F-number is 3.0 and the length is 200 mm, the focal length is set in a range of 100 to 230 mm, when the F-number is 3.0 and the length is 300 mm, the focal length is set in a range of 70 to 120 mm, and when the F-number is 4.5 and the length is 300 mm, the focal length is set in a range of 150 to 450 mm.

12. A liquid crystal display device as set forth in claim 11, wherein said linear light source in said converging reflector has a light emitting tube in the form of a deformed sphere, two curved surfaces of said first and second reflection surfaces being formed so as to have two focal points separately from each other at a circumferential surface of said tube.

13. A liquid crystal display device, comprising:
a liquid crystal panel;
a converging reflector including a linear light source formed of electrodes provided at two end points positioned with a predetermined space therebetween, a semitransparent light emitting tube arranged so as to surround an outer circumference of said electrodes, a first reflection surface having a curvature whose first back side focal point exists within said light emitting tube and whose first front side focal point exists on a side of said liquid crystal panel remote from said converging reflector and a second reflection surface arranged adjacently to said first reflection surface and having a second curvature whose second back side focal point exists within said light emitting tube at a point different from said first back side focal point and whose second front side focal point exists on said side of the liquid crystal panel remote from said converging reflector,
said liquid crystal panel being for passing selectively a light reflected from said converging reflector;
a condenser lens arranged between said converging reflector and said liquid crystal panel to condense light reflected from said converging reflector toward said liquid crystal panel; and
a projection lens for projecting, onto a plane of projection, light emitted from said liquid crystal panel,
wherein said device is formed so that a space between said two end points of said linear light source is 5.0 to 7.0 mm, that an aperture of said converging reflector is 100±20 mm, that said liquid crystal panel has a dimension of 43 mm×58 mm, that a length between said converging reflector and said liquid crystal panel is 200 to 300 mm, that a focal length of said condenser lens is 250 to 500 mm, that an F-number of said projection lens is 3.0 to 3.5 mm, and that said projection lens is formed as a telecentric system,
wherein said first back side focal point of said first reflection surface has coordinates of 1.5±1.0 mm, 0±0.5 mm in a coordinate system comprising a first axis coincident with an optical axis in which said one of the two end points of the linear light source forms an origin, and
wherein said second back side focal point of said second reflection surface has coordinates of 1.5±1.0 mm. 1.0±0.5 mm in said coordinate system.

14. A liquid crystal display device as set forth in claim 13, wherein said liquid crystal panel includes a first end portion, said first front side focal point of said first reflection surface has coordinates spaced by 50 to 150 mm in the optical axis direction from said liquid crystal panel and by −5 to −20 mm in the second axis direction from said first end portion of said liquid crystal panel in said coordinate system, said first end portion being formed by an intersection of a first axis parallel to the optical axis and a second axis perpendicular to the optical axis and passing through the liquid crystal panel,
wherein said second front side focal point of said second reflection surface has coordinates spaced by 50 to 150 mm in the optical axis from said liquid crystal panel and by −5 and −20 mm in the second axis direction from the first end portion of said liquid crystal panel in said coordinate system, and
wherein said first front side focal point is set at a position separate from the optical axis more than or equal to that of said second front side focal point in the second axis direction.

15. A liquid crystal display device as set forth in claim 13, wherein a contact point of said first and second reflection surfaces is positioned on a plane which is perpendicular to an optical axis and which passes through a center point of said two end points of the linear light source.

* * * * *